United States Patent [19]

Norrie

[11] Patent Number: 5,067,620
[45] Date of Patent: Nov. 26, 1991

[54] PRODUCT SUPPORT APPARATUS

[76] Inventor: Lyle W. Norrie, 24 Stoneglen Drive, Etobicoke, Ontario, Canada

[21] Appl. No.: 583,206

[22] Filed: Sep. 17, 1990

[51] Int. Cl.⁵ .............................................. A47F 5/00
[52] U.S. Cl. .................................... 211/113; 211/162
[58] Field of Search ................ 211/162, 119, 113, 116

[56] References Cited

U.S. PATENT DOCUMENTS

| | | | |
|---|---|---|---|
| 3,921,814 | 11/1975 | Solomon | 211/162 |
| 4,540,094 | 9/1985 | Norrie et al. | 211/119 X |
| 4,704,969 | 11/1987 | Schonenberger | 211/119 X |
| 4,893,715 | 1/1990 | Papazian et al. | 211/119 X |

Primary Examiner—Robert W. Gibson, Jr.

[57] ABSTRACT

A product support apparatus for supporting products on a conveyor system during processing, and having a hanger assembly upon which products may be placed, and having leg portions and abutments at each end, a support bar for the hanger assembly, the support bar having a pair of parallel spaced-apart rods supported side-by-side and defining an elongated slot therebetween, junctions, extending between the rod members clear of the slot, connection devices secured to the rod members for connection to a conveyor system, and, a check at each end of the rod members engageable by the abutments on the hanger assembly to restrict sliding movement.

10 Claims, 3 Drawing Sheets

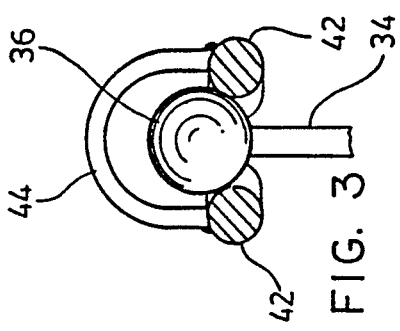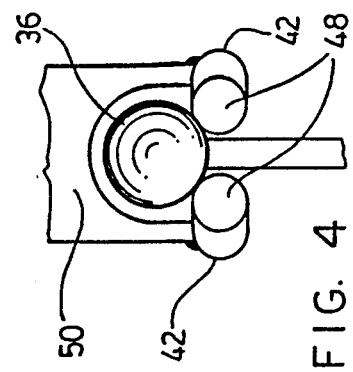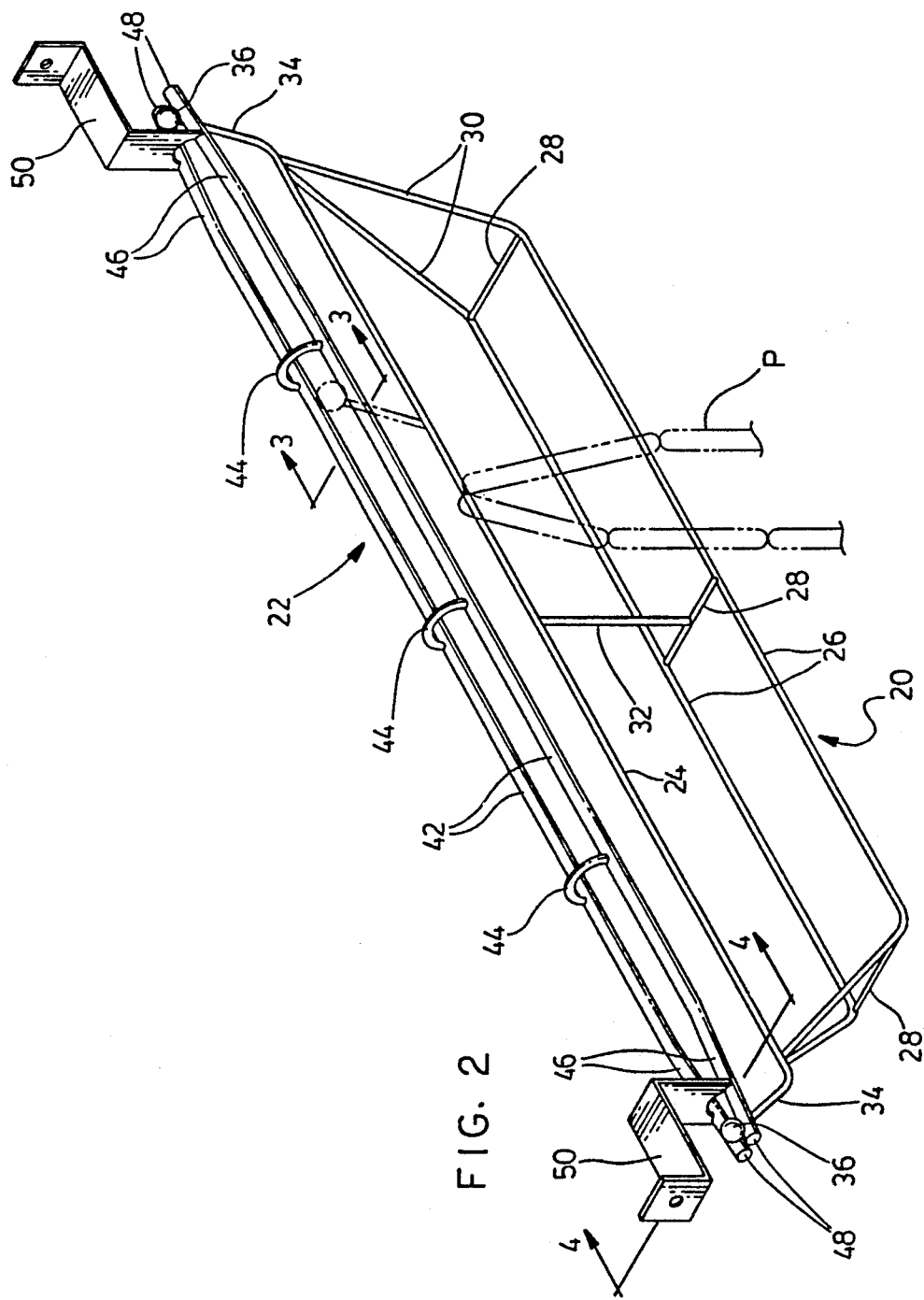

PRODUCT SUPPORT APPARATUS

FIELD OF THE INVENTION

The invention relates to product supports for supporting products while being processed in a smoke house, or cooking or processing facility, or the like.

BACKGROUND OF THE INVENTION

Meat and fish products, typically, for example, sausage products, may be processed in a variety of different ways. In some cases, products are simply stored for a certain length of time under controlled conditions of temperature and humidity. In other cases, products are cooked, or smoked, or cooked and smoked. While being processed, the products are, in most cases, supported on hangers, formerly referred to as smoke sticks. The products, usually sausages, were simply draped over the hangers and suspended on a conveyor system, while being stored in or transported through the processing facility. One of the problems in the design of such hangers is that they must be manually loaded with product and then placed in position on the support or conveyor. In the great majority of facilities, the loaded hangers must be placed by hand on the conveyor from one side or the other of the conveyor. In the past, it has been the usual practice to, as it were customize, the facility, so that hangers loaded with product could be loaded from one side of the conveyor, but not from the other.

In many cases, the hangers simply employed a form of hook system at each end, and the hooks then had to be manually engaged with portions of the conveyor. It will be apparent that this task presents some difficulties. A hanger loaded with product may weigh 50 to 70 pounds. Reaching into a chamber or an oven, and attempting to engage a hook located at the far end of the hanger, with a catch or eye at the far side of the conveyor, in these circumstances, is clearly a somewhat difficult task particularly, when it is borne in mind that the hangers must be loaded on the conveyor at brief time intervals.

An improved form of hanger is disclosed in U.S. in U.S. Pat. No. 4,540,094 in the name of Knud Simonsen Industries Limited. In this system, the hanger is provided with an arm at each end, terminating in a ball. The conveyor was provided with hanger support bars, each of the support bars being formed of a hollow tube, with an open slot along the lower side. In this system, the ball on one of the arms of the hanger could be fed into the hollow tube at the "near" end, and the ball could then be slid along inside the tube to the far end of the tube, and the ball at the near end of the hanger could then simply be placed in the near end of the tube. In this way, the weight of the product on the hanger was at least partially supported as soon as the first ball entered the near end of the tube.

An added advantage of this form of hanger system was the fact that the hangers could be attached to their support bars, from either side of the conveyor. This provided a considerably more flexible design. While this system functioned satisfactorily, it was somewhat more expensive to manufacture than the simpler forms of hangers used in the past, and consequently it was not always acceptable to customers. Clearly, it is desirable to provide a hanger having the advantages described above, but which can be manufactured at a price comparable with that of earlier prior art systems.

BRIEF SUMMARY OF THE INVENTION

With a view to achieving the advantages described above, the invention comprises a hanger apparatus for supporting products in a processing line having a conveyor system, and comprising product support apparatus for supporting products on a conveyor system during processing and comprising a hanger assembly upon which said products may be placed, said assembly defining two ends, and having arm portions, and abutment means, at each said end, support bar means for said hanger assembly and, in turn, comprising a pair of parallel rod members defining two ends and supported side-by-side and spaced apart a predetermined spacing and defining an elongated slot therebetween adapted to receive said leg portions, junction means extending between said rod members, clear of said slot, connection means secured to said rod members for connecting same to a said conveyor system, and, check means at each said end of said rod members engageable by said abutment means whereby to restrict sliding movement thereof along said rod members.

The invention further comprises such a product support apparatus wherein said hanger assembly comprises three spaced-apart mutually parallel hanger members, means joining said rod members together, end arms extending from opposite ends of said hanger members, abutment knob means on said end arms, said end arms defining a width adapted to fit within said predetermined spacing of said elongated slot, and said abutment knob means defining a predetermined width greater than said predetermined spacing, whereby to prevent the same from passing through said elongated slot.

The invention further comprises such a product support apparatus wherein said junction means extending between said rod members comprise a plurality of spaced-apart generally arch-shaped members, defining two lower free ends, joined to respective said rod members, thereby supporting same in said predetermined spaced-apart relation, said arch shaped members extending upwardly from said rod members whereby to permit free passage of said abutment means between said rod members and said junction means.

The invention further comprises such a product support apparatus including connection bar means connecting between at least two said arch shaped members.

The invention further comprises such a product support apparatus including connection column means on said connection bar means extending upwardly therefrom for connection to conveyor means.

The invention further comprises such a product support apparatus including end portions on said spaced-apart rod members, said end portions being angled towards one another in a converging manner, whereby to define a progressively reducing width of said elongated slot between said rod members at each said end thereof.

The invention further comprises such a product support apparatus including connection means at each end of said support bar means, said connection means being adapted to extend into engagement with spaced-apart conveyor means.

The invention further comprises such a product support apparatus further comprising at least two said hanger assemblies, located in vertically spaced relation, connection means extending therebetween, and each said hanger assembly being adapted to engage support bar means thereon whereby product may be supported in vertically spaced-apart relation.

The invention further comprises such a product support apparatus including attachment means on said hanger assemblies, said attachment means extending downwardly therefrom and being adapted to receive hanger stick means thereon.

The invention further comprises such a product support apparatus wherein said check means comprise ramp portions at each end of said rod members, defining upwardly sloping engagement surfaces for engaging said abutment means.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described embodiments of the invention.

IN THE DRAWINGS

FIG. 2 is a perspective illustration of the support bar and hanger carrying products in phantom and showing them partially assembled in phantom;

FIG. 3 is a section along the line 3—3 of FIG. 2;

FIG. 4 is a section along the line 4—4;

DESCRIPTION OF A SPECIFIC EMBODIMENT

Figure 1:
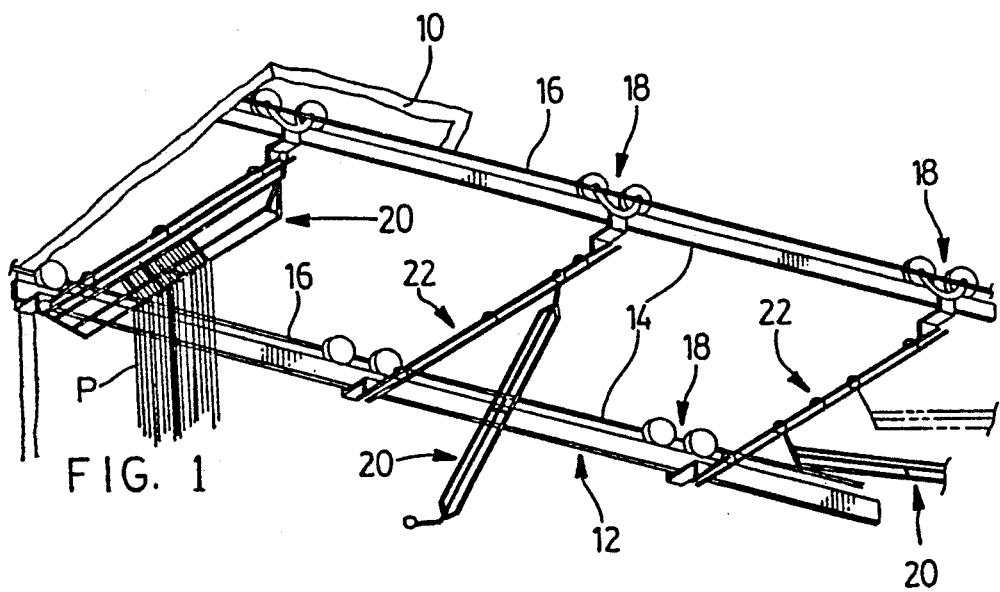
FIG. 1 is a lower perspective illustration of a simplified processing facility, showing support bars in accordance with the invention carried on a conveyor, and hangers with product thereon shown in phantom.
Figure 5:
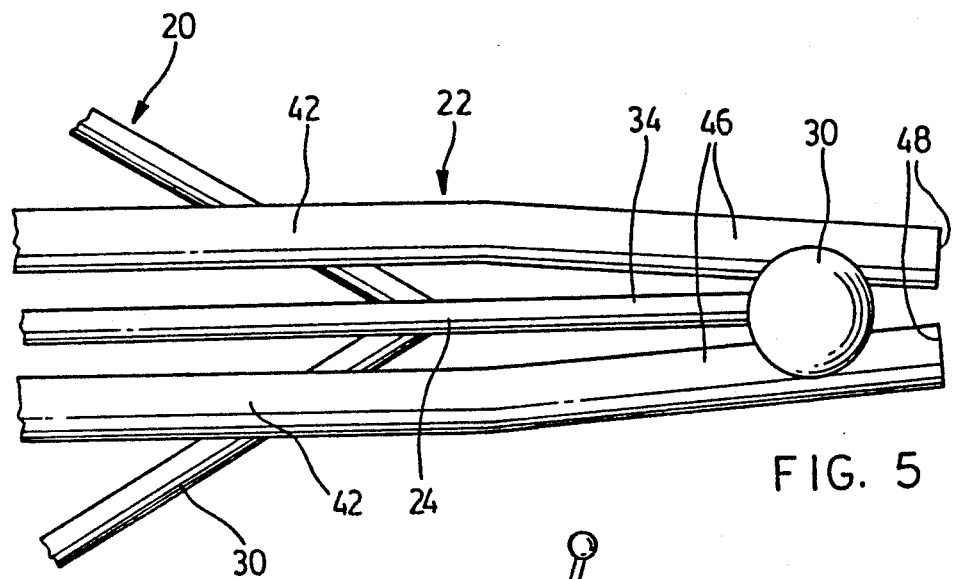
FIG. 5 is a top plan view of one end of the support bar.

Referring first of all to FIG. 1, it will be seen that the invention is here illustrated used in association with a processing chamber 10, which is simply shown having a rectangular cross-section, and being located along a straight line axis.

Figure 6:
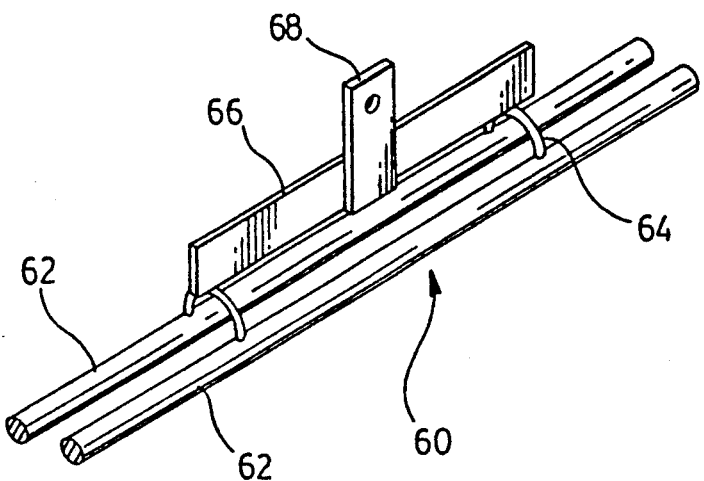
FIG. 6 is a perspective of a detail of an alternate embodiment.

As will become apparent below, the invention is not however limited to processing chambers having a straight line axis, but is also applicable to processing chambers extending around corners, or even of sinusoidal design (see FIG. 6).

As shown in FIG. 1, the chamber 10 has a straight line conveyor system indicated generally as 12 comprising two parallel spaced-apart rails 14—14, each of which is provided with suitable conveyor chains or other movement means 16—16. The chains or other movement means are driven by any suitable prime mover (not shown) such as is well known in the art, and which is omitted for the sake of clarity.

Pluralities of trollies 18—18 are provided on the rails, and are connected to the chains in any suitable manner such as is well known in the art. The trollies are spaced apart along the rails, by predetermined equal spacings, in most cases, the spacing being determined by the speed of travel of the chains, and the speed at which a man can lift, and position, a loaded hanger, and also the processing dwell time required within any given portion or zone of the chamber.

It will be understood that while the chamber 10 is illustrated as a single chamber, it may be divided up into two or more or several separate zones (not shown) in a manner well known in the art. Similarly, the zones themselves may be provided with various different forms of conditioning apparatus whereby various different processing conditions may be established in separate zones, again in a manner well known in the art. Thus, the chamber 10 may be a single continuous chamber, in which portions of the chamber constitute separate zones, or alternatively the chamber 10 may represent a series of separate chambers each providing a "zone", with the product transferred on the conveyor rails 14—14 from one chamber or "zone" to the next, and so on.

Referring now in more detail to FIGS. 2, 3, and 4, the hangers are illustrated generally as 20, and the support bars on which the hangers are releaseably supported are indicated generally as 22.

The hangers 20 will be seen to comprise upper transverse hanger members 24, and two lower transverse spaced apart hanger members 26—26. Members 26 are spaced apart by means of spacers 28-28-28. Generally upwardly angled sloping end members 30 connect the lower members 26 with the upper member 24.

A central vertical bracing member 32 extends from the intermediate one of the bracing members 28, and the upper member 24.

The upper member 24, at each end, is upwardly angled to provide respective end arm portions 34—34. At the free end of each of the end arms 34, there is provided an abutment or knob 36—36, which could be of a variety of shapes, the spherical shape shown being merely both functional, and simple to fabricate, and maintain and clean.

To this extent, the hangers 20 are generally similar to the hangers illustrated and described in the aforesaid U.S. Pat. No. 4,540,094.

A variety of forms of product may be supported on such a hanger 20. As illustrated in FIG. 2, such products are indicated by the general reference P, and in this case are illustrated as sausages. However, this is without limitation, since evidently many products that may be processed while hanging, may be supported on such hangers.

In accordance with the invention, as illustrated in more detail in FIG. 2, the hangers 20 are, in turn, supported on support rod members indicated generally as 22. The support rod members 22 are secured to the conveyor in a manner yet to be described, and comprise a pair of spaced apart parallel rod members 42—42, which are joined or united at spaced intervals by means of generally inverted U-shaped arch members 44-44-44 of semi-hoop shape. At each of their ends the rod members 42 are bent inwardly towards one another as at the bends 46, thus defining angled end portions 48 of rods 42, which progressively angle towards one another. Along most of their length, the rods 42 define a predetermined spacing therebetween somewhat less than the diameter of the abutments or knobs 36. Where the angled end portions 48 approach towards one another at each end, they define a narrowest spacing which is no less than the width of the end arms 34 of the hangers 20.

In order to support the support rod members 40 on the conveyor, they are provided with generally Z-shaped end brackets 50—50, which can be attached to the trollies 18 on the conveyor rails 14—14.

It will thus be seen that the hangers 20 can be attached to, and released from, the support rod members 22 by simply sliding the arm portions 34 and abutments 36 out of the end portions 48 of the rods 42, for loading and unloading.

It will also be observed, because of the tapering or angled arrangement of the end portions 48 of the rods 42, that they create what is in effect a "ramp" or slope, up which the abutment or knob 36 will have to ride, in order to free the arm 34 from the support rods. The end portions 48 thus function as a check means at each end of the support 22.

This will be noted particularly from a comparison of the secions of FIG. 3 and FIG. 4.

This will thus have the effect of tending to hold the hangers 20 in position between the two ends of the rod members 22, to check inadvertent disengagement during processing on the conveyor.

It will, of course, be appreciated that the invention is not confined solely to use on pairs of side-by-side conveyor rails 14. Thus, for example, other forms of conveyor are well known in which only a single conveyor rail is used. This has particular advantages in chambers which are not linear, but follow a curved or sinusoidal path. In this type of chamber, a single central conveyor rail is used, in a manner well known in the art (see, for example, U.S. Pat. No. 4,540,094 assigned to Knud Simonsen Industries Ltd.). In this type of conveyor rail, modified forms of support rod members 60 (FIG. 6) will comprise spaced-apart support rods 62—62 held together by semi-hoops 64—64. However, they will be supported centrally, instead of at each end. In order to do this, a transverse support bar 66 is welded between two of the hoops 64, and a central support tongue 68 is welded to bar 66 for connection to an overhead single rail conveyor (not shown) such as is well known in the art.

Figure 7:
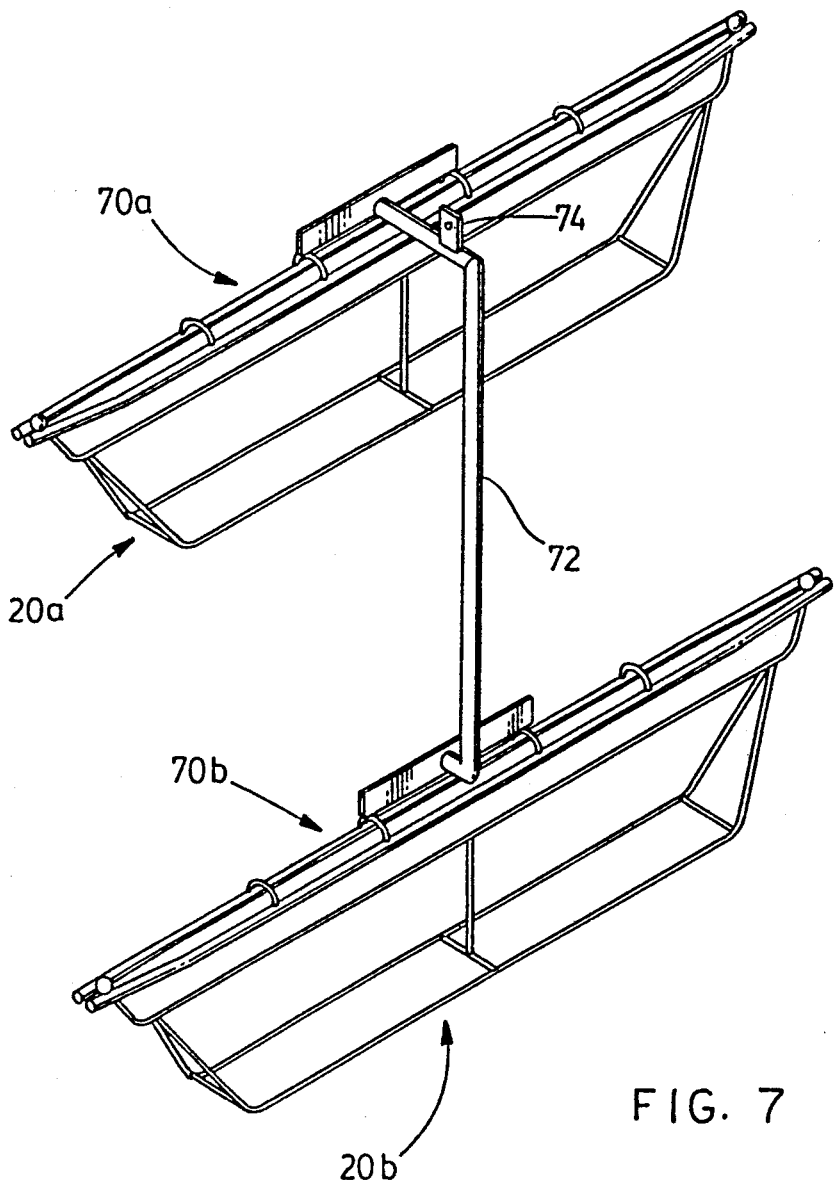
FIG. 7 is a perspective of a further alternate embodiment.

Furthermore, it is entirely possible that the support system may be applicable to conveyors wherein hangers are arranged in two tiers, one above the other, as shown in FIG. 7. Again, this is known in the art, being shown in U.S. Pat. No. 4,540,094 assigned to Knud Simonsen Industries Ltd. In this case, upper and lower support rod members 70a and 70b will be secured to a generally L-shaped junction rod 72, having a suspension flange 74 for connection to an overhead conveyor. In this way, upper and lower hangers 20a and 20b can be suspended, one above the other but in slightly offset vertical planes, thereby carrying a somewhat greater quantity of produce through a given processing facility or chamber.

Figure 8:
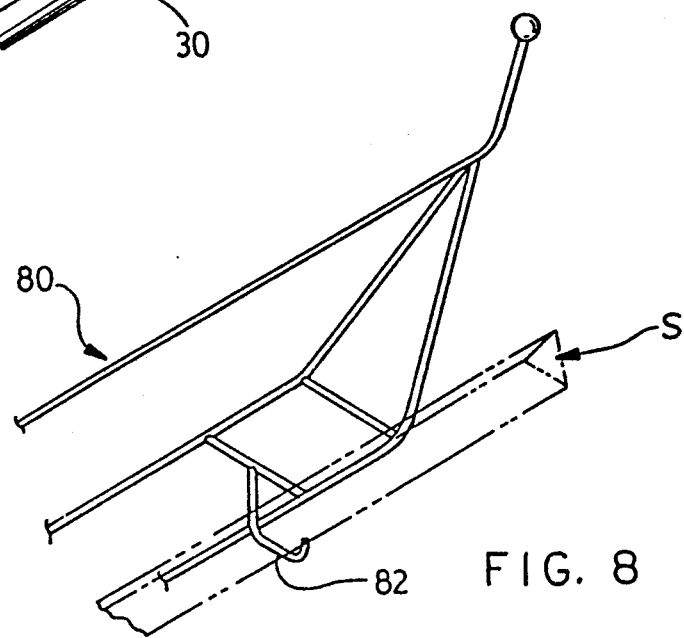
FIG. 8 is a perspective of a detail of an alternate form of hanger.

Furthermore, as shown in FIG. 8, in some cases it is desirable to provide for attachment of a simple form of wooden smokehouse stick (such as the stick S shown in phantom in FIG. 8). Typically such sticks S were of generally triangular shape in section as shown. Thus, in this case, a modified form of hanger 80 is provided, having generally L-shaped downwardly dependent suspension hooks 82 secured thereto for supporting sticks S if required.

In use product P, such as sausages, weiners, frankfurters or the like, may be manually looped around a hanger 20. One of the arms 34 may then be introduced between ends 48 of a support 22, with the weight of part of the products supported by knob 30. The hanger 20 is then pushed along its support 22, as shown in fig. 1. The other of the arms 34 is then slid between ends 48 of the support 22. The entire weight of the hanger 20, and the product P is then supported, by knobs 30 from its support 22.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A product support apparatus for supporting products on a conveyor system during processing, and comprising:

a hanger assembly upon which said products may be placed, said assembly defining two ends, and having arm portions, and abutment means, at each said end;

support bar means for said hanger assembly, said support bar means, in turn, comprising a pair of parallel rod members defining two ends and supported side-by-side and spaced apart a predetermined spacing and defining an elongated slot therebetween adapted to receive said arm portions;

junction means extending between said rod members clear of said slot;

connection means secured to said rod members for connecting same to a said conveyor system, and, check means at each said end of said rod members engageable by said abutment means whereby to restrict sliding movement thereof along said rod members.

2. A product support apparatus as claimed in claim 1 wherein said hanger assembly comprises three spaced-apart mutually parallel hanger members, means joining said hanger members together, end arms extending from opposite ends of said hanger members, abutment knob means on said end arms, said end arms defining a width adapted to fit within said predetermined spacing of said elongated slot, and said abutment knob means defining a predetermining width greater than said predetermined spacing, whereby to prevent the same from passing through said elongated slot.

3. A product support apparatus as claimed in claim 1 and wherein said junction means extending between said rod members comprise a plurality of spaced-apart generally arch-shaped members, defining two lower free ends, joined to respective said rod members, thereby supporting same in said predetermined spaced-apart relation, said arch shaped members extending upwardly from said rod members whereby to permit free passage of said abutment means between said rod members and said junction means.

4. A product support apparatus as claimed in claim 3 and including connection bar means connecting between at least two said arch members.

5. A product support apparatus as claimed in claim 4 including connection column means on the said bar connection means extending upwardly therefrom for connection to conveyor means.

6. A product support apparatus as claimed in claim 1 and including end portions on said spaced-apart rod members, said end portions being angled towards one another in a converging manner, whereby to define a progressively reducing width of said elongated slot between said rod members at each said end thereof.

7. A product support apparatus as claimed in claim 1 and including connection means at each end of said support bar means, said connection means being adapted to extend into engagement with spaced-apart conveyor means.

8. A product support apparatus as claimed in claim 1 and further comprising at least two said hanger assemblies, located in vertically spaced relation, connection means extending therebetween, and each said hanger assembly being adapted to engage support bar means thereon whereby product may be supported in vertically spaced-apart relation.

9. A product support apparatus as claimed in claim 1 including attachment means on said hanger assemblies, said attachment means extending downwardly therefrom and being adapted to receive hanger stick means thereon.

10. A product support apparatus as claimed in claim 1 wherein said check means comprise ramp portions at each end of said rod members, defining upwardly sloping engagement surfaces for engaging said abutment means.

* * * * *